UNITED STATES PATENT OFFICE.

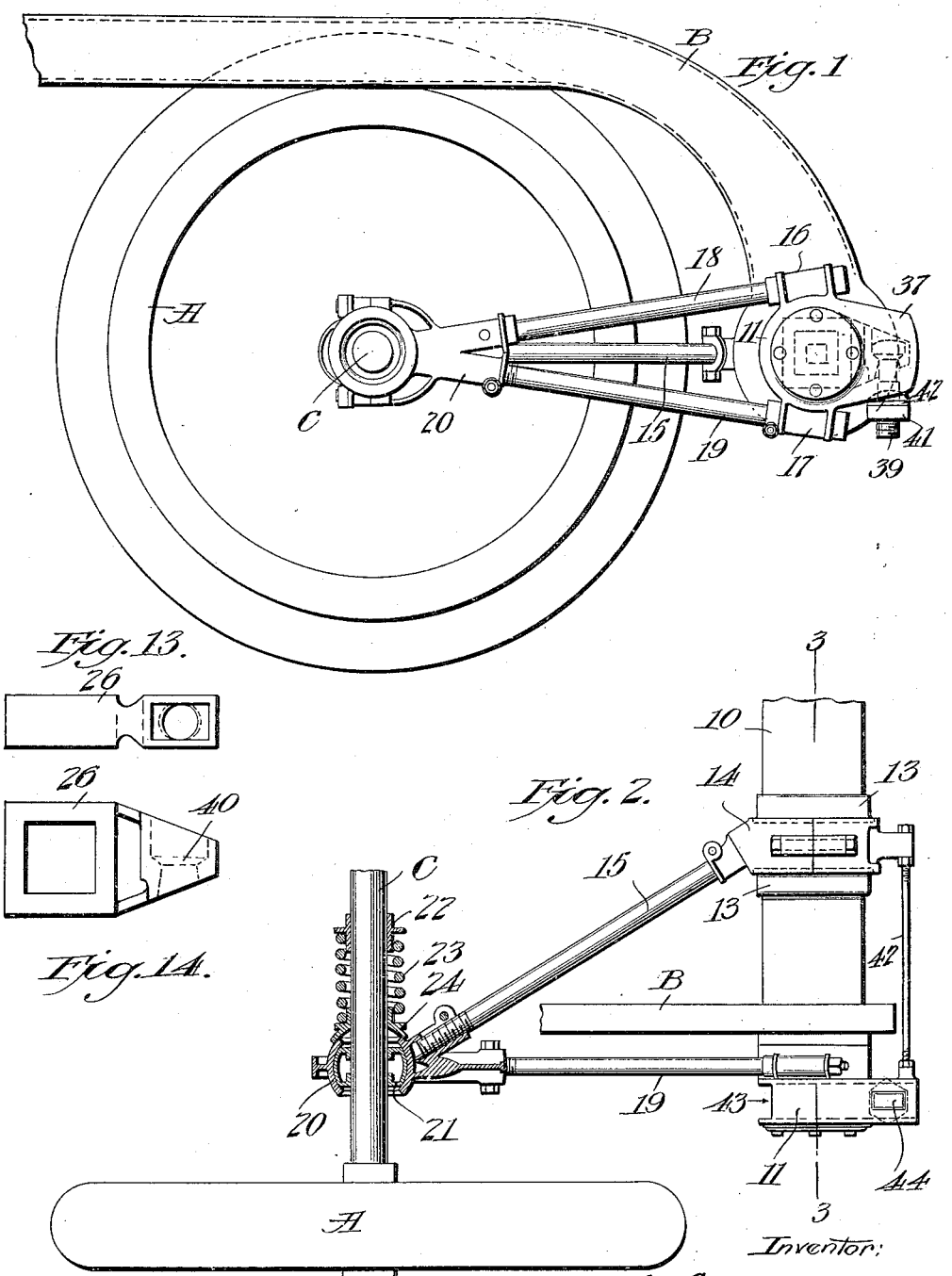

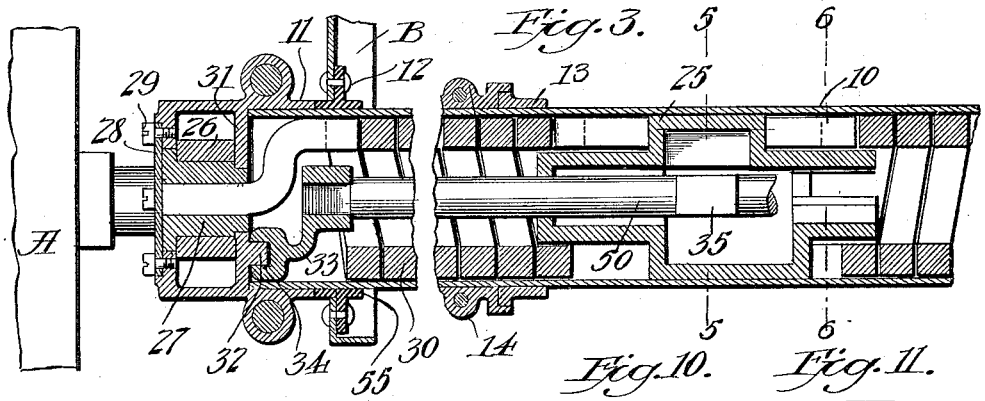
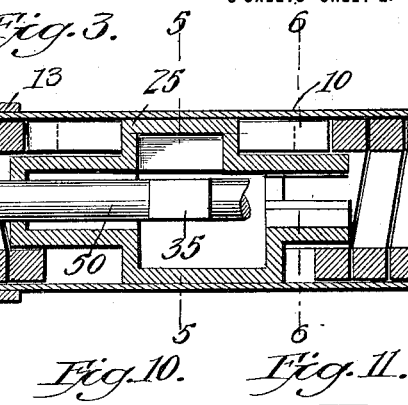
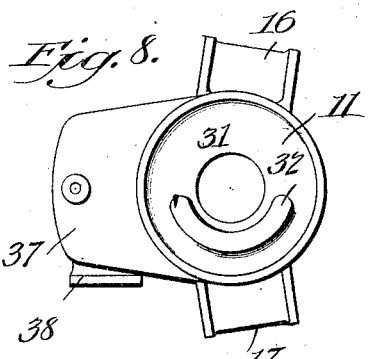
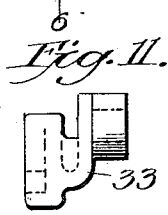
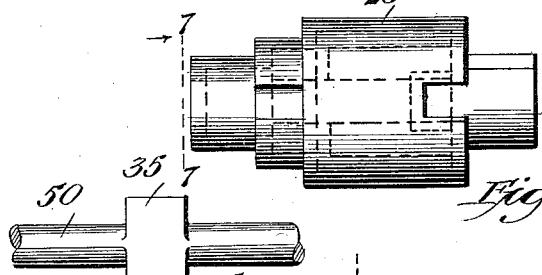
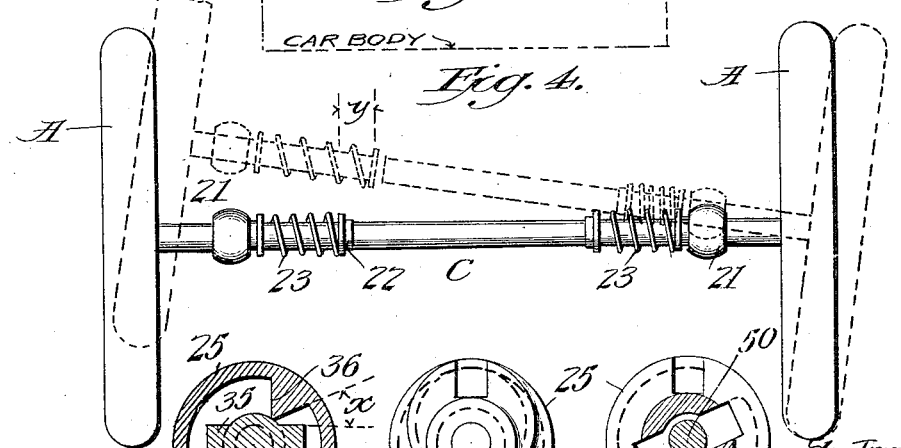

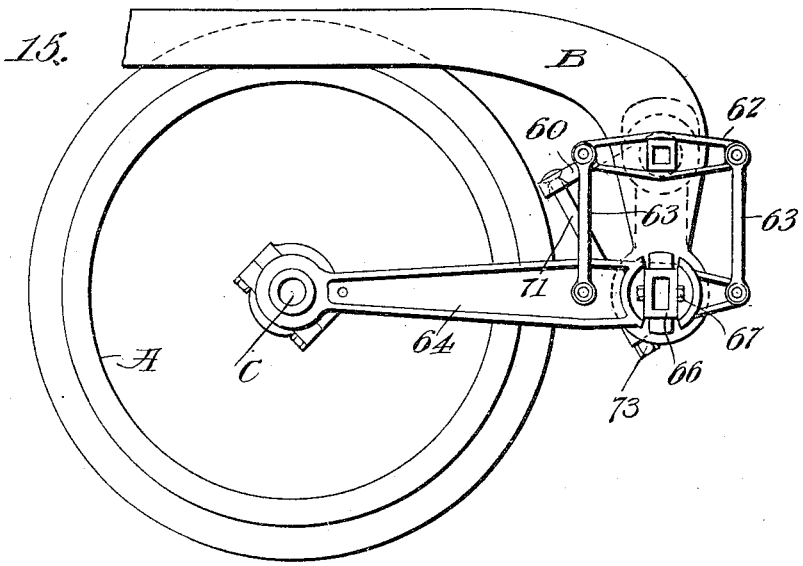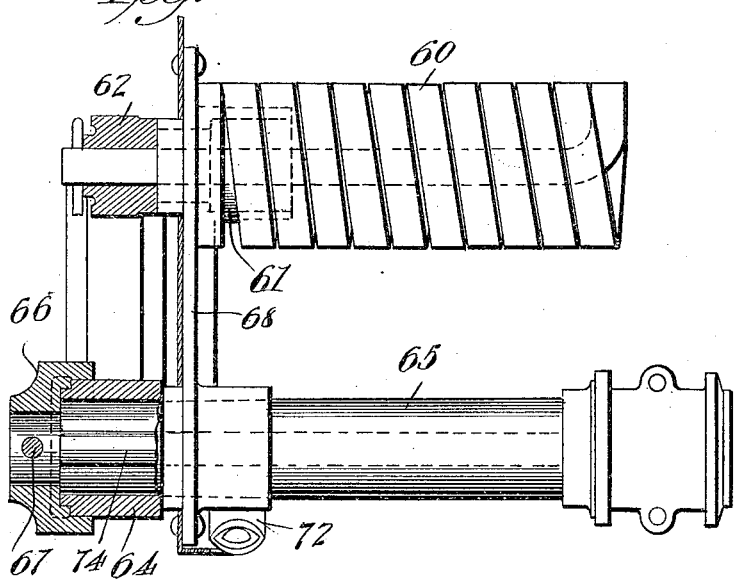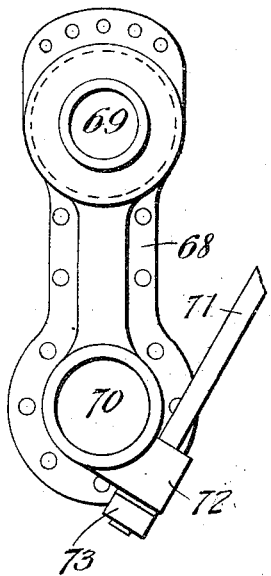

GUSTAF ARVID ANDERSON, OF WAYNESBORO, PENNSYLVANIA.

SPRING-RIGGING FOR VEHICLES.

1,137,721.  Specification of Letters Patent.  Patented Apr. 27, 1915.

Application filed September 8, 1913. Serial No. 788,663.

*To all whom it may concern:*

Be it known that I, GUSTAF A. ANDERSON, a citizen of the United States, residing at Waynesboro, Franklin county, and State of Pennsylvania, have invented and discovered certain new and useful Improvements in Spring-Rigging for Vehicles, of which the following is a specification.

One of the most difficult problems of automobile construction and operation is to obviate the disagreeable shocks and rebounds to the car body incident to driving at high speed over rough roads or obstructions. In machines where the car body is mounted upon the truck by springs of usual construction such consequences of high speed are of a very disagreeable nature. Such results are incident to the length of the springs employed, because the relative softness or stiffness of the operation of any spring deflected beyond its static load deflection is in proportion to its length. For example, let us assume that an automobile running at 30 miles an hour encounters an obstruction of 4" high, the time required for the wheel to be elevated by such an obstruction is about 1/50 of 1 second for a wheel 36" in diameter. During this brief period its inertia has maintained the body at practically the level on which it was running before the obstruction was met, the spring itself being deflected substantially equal to the height of the obstruction to permit the car to pass over it. In the case of a short spring, which the static load will normally deflect 4", for example, and which by such operation will therefore attain a total deflection of substantially 8", the spring pressure induced will be substantially twice the static load because spring pressures are always directly proportional to the spring deflections, and the equilibrium between the weight of the car body and the spring pressures on same will therefore be disturbed by an unbalanced force equal to the static load, resulting in a violent recoil or shock upon the car body, with the well known disagreeable results. It will be readily seen that if a spring rigging be provided wherein the springs are of sufficient length so that the static load of the car body would serve to deflect them 24", for example, that a car equipped therewith in passing over a 4" obstruction results in an additional 4" deflection of the springs, or a total deflection of 28", and the amount of unbalanced energy stored up in the springs by such operation will be equal to one-sixth the static load and likewise one-sixth that in the other case, which would produce a shock or recoil of only one-sixth the intensity of that in the first case, and thus reduces such shock or recoil to a practically negligible quantity.

My said invention consists, therefore in an improved construction of spring rigging or supports for vehicles, especially intended for the mounting of automobile bodies on the running gear thereof, whereby a spring rigging is provided which is capable of permitting a maximum movement of the running gear in relation to the automobile body with a minimum degree of displacement or shock upon said body, all as will be hereinafter more fully described and claimed.

Referring to the accompanying drawings, which are made a part hereof and on which similar reference characters indicate similar parts, Figure 1 is a side elevation of one wheel of an automobile and the rear end of one of the side bars of the chassis hung by means of my said invention, Fig. 2 a top or plan view thereof with certain details shown in section, Fig. 3 a sectional view on the dotted line 3—3 in Fig. 2, Fig. 4 a diagrammatic view illustrating the operation of one feature of my construction more clearly, Figs. 5, and 6 sectional views on the dotted lines 5—5, and 6—6, respectively, in Fig. 3, Fig. 7 an elevation of block 25 as seen from dotted line 7—7 in Fig. 9, Figs. 8 to 14 inclusive, detail views illustrating the form of various details separately more clearly, Fig. 15 a view similar to Fig. 1 illustrating a modified form, Fig. 16 a rear elevation partly in section illustrating said modified form, and Fig. 17 a detail view of one of the parts.

In said drawings the portions marked A represent the vehicle wheel, B the side bar of the automobile body frame, and C the axle, or axle casing, all of which parts are, or may be, of appropriate material and construction. The side bars B of the chassis extend rearwardly and are preferably curved downward so that their lower ends are substantially in the same plane with the axle C, as best shown in Fig. 1.

Between the lower ends of the bars B, on the respective sides of the automobile body is mounted a tubular casing 10. Said casing preferably extends at its ends through appropriate rings 55 and on its ends are mounted rocking castings or housings 11. Rings 55 are rigidly secured to the frame parts B by means of rivets 12 and to tube 10 in any approved manner. Collars 13 are rigidly secured to said tubular part 10 also at a distance from bar B and spaced a certain distance apart from one another, and a fitting 14 is mounted to rock on tube 10 between these collars and has a socket for the engagement of a brace rod 15. Other sockets 16 and 17 are formed on the upper and lower sides of the casting 11 for truss rods 18 and 19. A casting 20 is indirectly mounted on axis C and formed with three sockets to receive the inner ends of said brace rod 15, and truss rods 18, and 19. Said sockets are screw-threaded and the threaded parts clamped around the rods 15 and 19 exposed to tension, but socket for rod 18, exposed to compression only, is threadless and rod 18 kept from slipping out of same by a cotter.

Within the hollow inner end of casting 20 is mounted a part 21 adapted to slide on the axle C and with convex outer face on which the concave face of the inner end of casting 20 is adapted to move, forming a universal connection between the several rods and the axle. A collar 22 is rigidly mounted on the axle C at a distance inside of the casting 20 and a coiled spring 23 is interposed between said collar, and a sliding collar 24 which is adapted to abut against said casting 20, and is formed with a cupped-shaped flange which is adapted to overlap the edges of said casting and thus form a close joint which, while permitting a free rocking movement of the casting 20, will protect the interior from dirt and consequent wear between the parts.

Centrally located in tube 10 is a block or casting 25 which is rigidly secured to said tube. In casting 11 is mounted an arm 26 of the form best shown in Figs. 13 and 14, having a square aperture adapted to receive a rectangular block 27 formed with end portions that are circular and adapted to turn in appropriate circular apertures in the outer end of said casting 11 and an intermediate web or portion 31. The outer end of said casting 11 is normally open, but provided with a plate 28, secured thereto by screws 29, which covers the outer end of the block 27 and the joints between the several parts and prevents said block 27 from axial displacement in regard to 11. A long coiled spring 30 is mounted with its squared outer end in a rectangular central aperture in block 27 and with its inner squared end secured to casting 25.

Casting 11 is formed with a rearwardly projecting arm 37 having a concave-faced socket 38 in its lower side, through which a bolt 39 extends. Said bolt 39 is formed with a head having a ball-shaped under face resting in a correspondingly formed seat 40 in the rear end of arm 26. Said bolt is provided with a nut 41 and a washer 42 with a ball-shaped upper surface which rests in the concave surface of the socket 38 above said nut. By this means the outer end of arm 26 is adjustably secured to the casting 11 in a manner to permit the rotary adjustment of said arm 26 to regulate the tension of spring 30.

In the drawings it has been thought necessary to illustrate the construction at one end of the axle only inasmuch as the other end is a duplicate thereof. On the inner face of the cross web 31 in the part 11 is formed a segmental rib 32 (see Fig. 8) and a crank-head 33, shown in detail in Figs. 10 and 11, mounted on the end of a longitudinal tempered spring rod 50, is formed with a segmental recess or groove 34 which fits over said rib 32 and thus connects said spring rod with the rocking casting 11. Said groove 34 is somewhat longer than the rib 32 so that the casting 11 is adapted to have a limited rotary movement before either end of rib 32 will engage with the end of groove 34. Said spring rod 50 is connected with a casting 11 on the opposite side of the machine in the same manner and in its center is provided with transversely extending wings 35 adjacent to which, on the interior of block or casting 25, are formed internal V-shaped lugs 36, said lugs being tapered to a point at their inner ends. The normal position of said lugs and wings is as best shown in Fig. 5, wherein the rod is shown as adapted to have a considerable angular movement (indicated by dotted lines X) in that direction of rotation of parts 11, 33 and 50 which signifies an approach of axle C to car body frame B, before said wings will contact with said lugs, for a purpose to be presently described. Casting 11 is preferably secured from longitudinal movement on tube 10 by means of distance rods 42 as best shown in Fig. 2. The front side of casting 11, as at point 43, is preferably formed open to permit sliding arm 26 into place when the parts are assembled and it is also formed with an aperture at 44 in its top to permit the insertion of bolt 39.

The operation of my said invention will be best understood by considering the construction as above described in connection with Fig. 4, wherein the position of one axle and its wheels are represented in whole lines in their normal position and in dotted lines in the position they occupy when one wheel is passing over an obstruction. With the common type of spring rigging an automobile going at a high speed and passing over an obstruction as indicated in this figure would cause the wheel resting on the ground to drag slightly, transversely of the track, because of the weight and momentum of the car body which will cause said car body to continue in practically a straight and horizontal direction, while the axle, being thrown to the right, would necessarily cause the wheel on the ground to slightly drag to the left, causing undue abrasion and wear upon the tire. At the same time the springs are subjected to a severe twisting and cramping action destructive of their life and resiliency and frequently causing them to break. In my construction of spring rigging the axle, sliding through the bearings 21, (as indicated by dotted lines $y$ in Fig. 4) causes the spring 23 on the right hand end of the axle to compress and the spring on the left hand end to expand, permitting the car body to continue in the direction impelled by its momentum and the wheel to maintain its normal center of rotation, as $d$, without causing any transverse strain upon the surface of the wheel resting upon the ground. At the same time the elevation of the wheel serves to turn casting 11 and, through its connection by means of the arm 37, bolt 39 and arm 26 with the spring 30, will cause said spring to deflect but on account of the great length of said spring and its resulting softness this deflection is accompanied with comparatively insignificant increase in spring pressure and thus the pitch of the car body produced is also insignificant, with a resulting insignificant shock to the car body. When the movement of said casting 11 is sufficient to bring either end of the segmental rib 32 against either end of the segmental groove 34 in the clip 33, spring rod 50 will be brought under a torsional strain and the crank-head 33 at the other end of the axle will be brought to bear against its interlocking segmental rib 32, a relative movement of the two castings 11 stopped and both springs 30 compelled to serve the obstructed side of the car. When the automobile is at high speed and strikes a grade of considerable pitch, the changing from the motion on the level to the grade causes a sudden contraction or expansion of the springs because of the inertia of the heavy car body which contesting any change of motion, opposes the change in vertical direction which a change of grade of the road bed requires. Because of the great length and resiliency of the springs 30 this may, in extreme cases, carry the car axle into contact with the under side of the car body frame and result in "bumping." To obviate this I provide the transversely extending wings 35 on the spring rod 50 which, under such conditions, are adapted to contact with the appropriate sides of the V-shaped lugs 36 on the interior of the casting 25 and thus bring the torsional resisting power of the spring 50 into operation to prevent the contact between the axle and the car body and aid in lifting said car body and impart to same the needed vertical velocity in a manner to avoid shock and jar. Under normal conditions the springs 30 will carry the static load and take care of all variations in the relative positions of the axle and car body caused by the irregularities in the surface over which the car is passing. Only on sharp curves taken at high speed, or on a strong change in the pitch of a grade taken at high speed, or for these two conditions combined, is the spring rod 50 called into operation.

In Figs. 15, 16, and 17 I have illustrated a modification wherein the spring 60, corresponding to the springs 30, is mounted around a stud 61 forming a part of casting 68. One end of said spring 60 is bent to extend centrally through the coil and stud 61 and bar B and is connected to a double ended lever 62 by having its square end inserted in a square socket in the center of said lever. The ends of said lever are connected by links 63 with lever 64 mounted at one end on the axle C and at the other end mounted to rock on a suitable bearing formed by the ends of a cylinder 65 extending transversely across the car and through bars B, and casting 68. Said bar is formed with a notch on opposite sides where it surrounds the end of cylinder 65 and a lug 66 is bolted to the end of a spring rod 74 by a bolt 67, said lug 66 projecting into said notches to limit the movement in opposite directions of said arm 64, in regard to its mate on the opposite side of the car body. Casting 68 with apertures 69 and 70, is connected to the inner face of each side bar B. Cylinder 65 passes through 70 and is rigidly secured to 68. One end of spring 60 passes fully through aperture 69. An adjustable rod 71 extends through a lug 72 on the lower end of said casting and is provided with a nut 73, the upper end of said rod is connected with the one end of spring 60 by which its tension may be adjusted. This illustrates one of various easily devised modifications of the principal construction which may be made without departing from the spirit of my said invention.

Having thus fully described my said invention, what I claim as new and desire to secure by Letters Patent is:

1. A spring rigging for vehicles comprising a truck including wheels and axles, a car body, springs interposed between said truck and car body adapted to support the same, ball and socket connections between said springs and the axle slidably mounted upon said axle whereby a transverse movement of the axle is permitted independent of the car body, and springs for returning said parts to their normal relative positions, substantially as set forth.

2. A spring rigging for vehicles comprising a truck including wheels with axles, a car body, springs interposed between the axles of said truck and said car body, a ball and socket connection slidably mounted on the axle, springs for maintaining the normal relative position of the parts, and means for limiting the movement of said parts, substantially as set forth.

3. A spring rigging for vehicles comprising a truck including wheels with axles, a car body, a connection between the axle and the car body extending to one side of said axle including a pivotal connection with the body and a pivotal connection with the axle, and a helical spring mounted at the pivotal connection of the car body with one end attached to the car body structure and the other end attached to the part pivotally mounted on the axle, and arranged to support said car body from said axle and to be contracted and expanded by the deflection of the axle to and from said car body, substantially as set forth.

4. A spring rigging for vehicles comprising a truck including wheels with axles, a car body, a connection pivotally attached to the car body structure at one end and mounted on the axle at its other end by a connection adapted to pivot and slide, a helical spring interposed in the pivotal joint between the connection and the car body with one end attached to the car body structure and the other end secured to said connection, whereby the weight of the car body is supported from the axle by said spring, and said spring is contracted and expanded by the deflection of the axle to and from said car body, substantially as set forth.

5. In a vehicle, the combination with an axle, of a part mounted to slide thereon embodying a universal connection, the car body supported on said axle from said universal connection, and a spring interposed between said car body and said universal connection adapted to support said car body under normal conditions, substantially as set forth.

6. In a vehicle, the combination with an axle and body, of a spring rigging for supporting said body from said axle comprising a coiled spring one end of which is fast to the car body frame and the other end of which is connected with one end of a rocking support the other end of which support is pivotally connected with said axle, substantially as set forth.

7. In a vehicle, the combination with the axle and body, of rocking supports on the axle a spring rigging interposed between the frame of said body and said axle comprising a tube extending from one side of the frame to the other and rigidly connected therewith, a central block or casting rigidly mounted in said tube, and a coiled spring extending each way from said central block, the inner end of each spring being rigidly connected therewith and their outer ends connected with said rocking supports on the respective ends of said axle, substantially as set forth.

8. In a vehicle, the combination with an axle and the body, of a spring rigging interposed between said axle and the frame of said body, comprising a coiled spring connected at one end with the frame and at the other end with a support mounted to rock on said axle, and a supplemental spring rod extending centrally through said coiled spring and connected with said rocking support to have a limited free movement and provided with contact arms adapted to strike stationary parts adjacent thereto and limit its rotary movement, whereby the torsional resistance of said spring rod is brought into action to supplement the action of the coiled spring under abnormal conditions, substantially as set forth.

9. In a vehicle, the combination with an axle and the body, of a spring rigging interposed between said axle and the frame of said body comprising a sliding sleeve on the axle, and a universal joint connected therewith, a rocking part mounted on said universal joint and connected with the body frame, and a spring interposed between said rocking part and said body frame, substantially as set forth.

10. In a spring rigging for vehicles the combination of a truck, a body, a member extending in a substantially horizontal direction mounted at one end to rock upon the axle and at its other end to rock on a part of the body frame a helical spring interposed between said truck and body one end being connected with the body and the other end with said member, and means for adjusting the tension of said spring, substantially as set forth.

11. A spring rigging for vehicles comprising a truck, a body, and a transverse tube connected with said body, a central block secured rigidly in said tube, a coiled spring extending each way from said central block, the inner end of each spring being rigidly connected with said central block, and their outer ends connected with rocking supports on the respective ends of the axle, and means for adjusting the connection between the springs and said supports whereby the tension of said spring may be regulated to secure a substantial mean level of the body irrespective of the static load supported by said spring, substantially as set forth.

12. A spring rigging for vehicles comprising a connecting member between the axle and supporting spring, said spring being carried on a depending part of the vehicle frame, and the connection between said member and the axle embodying a universal joint, whereby said connecting member is adapted to move in the arc of a circle about the point of connection as said spring contracts and expands under the changing load of the car body, substantially as set forth.

13. In combination with a vehicle body and its axles of a spring rigging interposed between said body and axles comprising rocking arms pivotally connected with said body, and connected with the axles by means of universal bearings, helical springs connected to said body at one end and to the rocking arms at the other end arranged to support the body in proper normal relation above the axles, substantially as set forth.

14. In a vehicle the combination of the truck, the body, a transverse tube connected with said body, a central part fixed in said tube, helical springs secured at their inner ends in said part and extending transversely and connected at their outer ends with parts pivotally connected with the axle, said springs arranged with their tension adapted to support the body in normal relation above said axle, and a supplemental torsional spring arranged to be brought into action on abnormal displacement of the body and axle, substantially as set forth.

15. A spring rigging for vehicles comprising horizontally arranged helical springs interposed between parts carried by the body, and parts carried by the axle and arranged to support the body in normal relation above the axle, and a spring rod arranged to be brought under torsional strain on abnormal displacement between said axle and body, substantially as set forth.

In witness whereof, I have hereunto set my hand and seal at Waynesboro, Pennsylvania this sixth day of September, A. D. nineteen hundred and thirteen.

GUSTAF ARVID ANDERSON. [L. S.]

Witnesses:
 GEO. B. BEAVER,
 DANIEL S. BEARD.

Copies of this patent may be obtained for five cents each, by addressing the "Commissioner of Patents, Washington, D. C."